United States Patent [19]

Hata et al.

[11] Patent Number: 4,558,021

[45] Date of Patent: Dec. 10, 1985

[54] CERAMIC HIGH DIELECTRIC COMPOSITION

[75] Inventors: Takuoki Hata, Neyagawa; Akira Ohmi, Hirakata; Tadayoshi Ushijima, Kadoma; Takayuki Kuroda, Nishinomiya, all of Japan

[73] Assignee: Matsushita Electric Industrial Co., Ltd., Kadoma, Japan

[21] Appl. No.: 582,570

[22] PCT Filed: Jun. 17, 1983

[86] PCT No.: PCT/JP83/00194

§ 371 Date: Feb. 16, 1984

§ 102(e) Date: Feb. 16, 1984

[87] PCT Pub. No.: WO84/00076

PCT Pub. Date: Jan. 5, 1984

[22] Filed: Feb. 16, 1984

[30] Foreign Application Priority Data

| Jun. 18, 1982 | [JP] | Japan | 57-105915 |
| Jun. 18, 1982 | [JP] | Japan | 57-105916 |
| Jun. 18, 1982 | [JP] | Japan | 57-105917 |
| Jun. 18, 1982 | [JP] | Japan | 57-105918 |
| Jul. 7, 1982 | [JP] | Japan | 57-118959 |
| Nov. 10, 1982 | [JP] | Japan | 57-197003 |
| Nov. 10, 1982 | [JP] | Japan | 57-197004 |
| Dec. 24, 1982 | [JP] | Japan | 57-231820 |
| Dec. 27, 1982 | [JP] | Japan | 57-231562 |
| Dec. 27, 1982 | [JP] | Japan | 57-231563 |
| Dec. 27, 1982 | [JP] | Japan | 57-231564 |
| Dec. 28, 1982 | [JP] | Japan | 57-232742 |

[51] Int. Cl.[4] ............................................. C04B 35/46
[52] U.S. Cl. ................................... 501/137; 361/321; 501/139; 501/152
[58] Field of Search ............... 501/137, 139, 138, 136, 501/135; 361/320, 321, 322

[56] References Cited

U.S. PATENT DOCUMENTS

| 3,268,783 | 8/1966 | Saburi | 501/139 |
| 3,490,927 | 1/1970 | Kahn et al. | 501/137 |
| 3,753,911 | 8/1973 | Walker et al. | 501/139 |
| 4,073,989 | 2/1978 | Wainer | 428/131 |
| 4,086,649 | 4/1978 | Hanold | 501/137 |
| 4,275,521 | 6/1981 | Gerstenberger et al. | 42/84 |
| 4,280,846 | 7/1981 | Charles et al. | 264/66 |

FOREIGN PATENT DOCUMENTS

| 2941304 | 4/1980 | Fed. Rep. of Germany | 501/139 |
| 52-072499 | 6/1977 | Japan | 501/137 |
| 55-066803 | 5/1980 | Japan | |
| 58-009877 | 1/1983 | Japan | |
| 58-028103 | 2/1983 | Japan | |

*Primary Examiner*—Helen M. McCarthy
*Attorney, Agent, or Firm*—Cushman, Darby & Cushman

[57] ABSTRACT

In a ceramic dielectric composition with $BaTiO_3$ as host material, $CaTiO_3$ and $Sb_2O_3$ are added to be contained, and besides thereto any one of $Nd_2O_3$, $La_2O_3$ and $Sm_2O_3$ are added to be included, thereby ceramic dielectric composition having high dielectric constant, small voltage dependency of characteristics, large bending force, and small equivalent series resistance in high frequency range is provided.

Also, by having $BaTiO_3$ as host material and adding $CaTiO_3$ and $Ta_2O_5$ thereto, and further adding $Sb_2O_3$ or $Pr_6O_{11}$, similar superior characteristics to the above-mentioned ceramic high dielectric composition is obtainable.

Besides, by adding $SiO_2$ to the above-mentioned ceramic high dielectric compositions, strength is further increased.

These ceramic dielectric composition of high dielectric constant is suitable for, for example, dielectric substance of laminated ceramic capacitor.

12 Claims, 8 Drawing Figures

CERAMIC HIGH DIELECTRIC COMPOSITION

DESCRIPTION

1. Technical Field

The present invention relates to ceramic high dielectric composition to be used mainly as laminated ceramic capacitor.

2. Background Art

Hitherto many proposals have been made on ceramic high dielectric compositions with barium titanate ($BaTiO_3$) as host material, and they have been used specially for disc type ceramic capacitors.

The barium titanate is a material having ferrodielectric characteristic, and its Curie point lies around 120° C. Demarcated by this 120° C., in the lower temperature side thereof it becomes tetragonal, and in the upper temperature side thereof it becomes cubic. And it is well known that in the tetragonal region it shows ferrodielectric characteristic and in the cubic region it shows paraelectric characteristic.

Since, ceramic of such sole barium titanate has a very large change of dielectric constant dependent on temperature and also has a large dielectric dissipation (tan $\delta$) in a temperature range of about normal temperature, it is hardly used as capacitor independently; and hitherto devices are made to shift the Curie point to around the normal temperature and to decrease the temperature dependency by adding various additives. $CaTiO_3$, $BaZrO_3$, $SrTiO_3$, $BaSnO_3$ and etc. are known as representative of the additives. By adding these appropriately and by adjusting with a small amount composition, material having characteristics of X7R, Y5T, Y5V, Z4V and etc. of EIA (Electronic Industries Association) standard are offered. The fact is that these materials have been hitherto utilized generally as ceramic capacitors of thick disc type, for instance having 0.5–1 mm thickness of element.

In these years, miniaturization of capacitors is progressing corresponding to miniaturization of various electronics-related components, and the most in laminated ceramic capacitors. The laminated layer ceramic capacitor is that in which ceramic dielectric body is made into thin film of around 25–100 $\mu$m and sandwiching comb type electrodes to form a multiple layer structure. And since a ratio of electrodes area to electrodes gap can be made very large, its capacitance per volume can be made as large as 100 times or larger in comparison with the ceramic disc type capacitor, and the same capacitance can be assured with as small volume as 1/10 or less, and therefore much miniaturization is easy.

When such ceramic dielectric thin film is used, however, it is the fact that conventional disc type ceramic composition can not be used as it is. That is, since a voltage per unit length is loaded 10 times or more than the conventional case, a material having small voltage-dependencies of ceramic dielectric constant and small dissipation factor have become to be needed. Besides, due to recent adoption of direct bonding system onto printed circuit board, such a strong material as is not destroyed by bending of the print circuit board is needed. Further, since in electronics tuner or the like using the laminated ceramic capacitors, the frequencies are shifting to higher band of high sensitivities, those having good high frequency characteristics become necessary also with regard to the laminated ceramic capacitors. Especially, those having characteristic of YD in JIS (Japanese Industrial) standard or characteristic of Y5T in EIA standard are requested by a large number in relation to electronic tuner, and those which have dielectric constant of 3000 or above and tan $\delta$ of 2.0% or lower and low equivalent series resistance at frequency band of 1–100 MHz are requested.

DISCLOSURE OF THE INVENTION

Accordingly, this invention provide a dielectric ceramic composition having high dielectric constant, a small dependency of characteristics on voltage, a large bending force, and moreover a small equivalent series resistance in the high frequency region, by having $BaTiO_3$ as host material and to this adding $CaTiO_3$ and $Sb_2O_3$ to be contained, and further adding either of $Nd_2O_3$, $La_2O_3$ and $Sm_2O_3$ to be contained. Besides, superior characteristics similar to the above-mentioned dielectric ceramic composition is obtainable by having $BaTiO_3$ as host material and containing $CaTiO_3$ and $Ta_2O_5$ as additives, and further adding $Sb_2O_3$ or $Pr_6O_{11}$ to be contained.

Furthermore, by adding $SiO_2$ as to be contained to the above-described dielectric ceramic composition, its strength further increases.

THE BEST MODE FOR EMBODYING THE INVENTION

The present invention is a ceramic high dielectric composition having barium titanate ($BaTiO_3$) as host material, added with calcium titanate ($CaTiO_3$), antimony sesquioxide ($Sb_2O_3$) and neodymium oxide ($Nd_2O_3$), and further if necesary, added with small amount of additives, being belonging to a different group from the conventional compositions, hereinafter it is explained in detail in accordance with the embodiments.

Firstly, to 100 weight parts of $BaTiO_3$ ( of 98% or higher purity), various additives are added and sufficiently mixed in a ball mill. The mixture is added with a small amount of 5% aqueous solution of PVA (polyvinylalcohol), then blended in mortar and filtrated through 30 mesh sieve to be granulated. The granulated powder is put in a die having inner diameter of 13 mm and molded in a size of 13 mm diameter and 0.5 mm thickness by application of a pressure of 1 ton/cm$^2$. Also in the similar way, a mold of 47 mm $\times$ 12.5 mm $\times$ 1.5 mm size is formed by means of a rectangular die of 47 mm $\times$ 12.5 mm size. These molds are sintered at 1250°–1400° C. for 1–5 hours. Then, on both face of the disc-shaped sintered body Ag electrodes are provided. The below-mentioned Table 1 shows characteristics of the sintered body obtained by means of various compositions of $CaTiO_3$, $Sb_2O_3$ and $Nd_2O_3$ for 100 weight parts of $BaTiO_3$. Besides, are shown characteristics of sintered body obtained by adding at least one of oxides of Mn, Cr, Fe, Ni and Co. In the table $\epsilon_{25}$ shows dielectric constant obtained from capacitance measured at 25° C. with 1 KHz AC 1 and tan $\epsilon$ a dielectric loss at that time measured with an AC voltage of effective value 50 V/mm. IR is insulation rsistance measured by direct current (DC) 50 V at 20° C., BDV is rising breakdown voltage value, and AC-V is tan $\delta$ value measured with the effective voltage 50 V/mm AC of 1 KHz. Further, TC shows change rate of capacitance measured at −30° C. and +85° C. as reference.

And sintering condition for the above case was 1350° C. for 2 hours.

prepared by adding 3 weight parts of $BaZrO_3$, 0.4 weight part of $MgTiO_3$ and 0.2 weight parts of $MnO_2$ to 100 weight parts of $BaTiO_3$.

In this case, size of the element is 3.07 mm×1.56 mm×0.56 mm. Incidentally, in FIG. 1 numeral 1 designates ceramic dielectric body consisting of the compound of the sample No. 13, 2 palladium electrodes, and 3 terminal electrodes (Ag electrodes). In the Table 2, C and tan $\delta$ are values measured with 1 KHz AC 1 V at 20° C., BDVe is rising breakdown voltage. The bending strength is the pressure immediately before destruction of element when the element 4 is held with 2.5 mm span and center part of the element 4 is pressed with a knife

TABLE 1

| Sample No. | Additive composition (weight parts) | | | | | $\epsilon_{25}$ | tan $\delta$ (%) | IR ($\Omega \cdot$ cm) | BDV (kV/mm) | AC-V (%) | T C (%) | | Constant of bending strength (Kg/cm$^2$) |
|---|---|---|---|---|---|---|---|---|---|---|---|---|---|
| | $CaTiO_3$ | $Sb_2O_3$ | $Nd_2O_3$ | Other | | | | | | | −30° C. | +85° C. | |
| *1 | 0 | 2.5 | 2.5 | — | | 4048 | 1.0 | 5 × 10$^{13}$ | 11 | 3.5 | −20 | −46 | 870 |
| 2 | 5.0 | 1.5 | 1.5 | — | | 3874 | 0.8 | 6 × 10$^{13}$ | 18 | 1.4 | −8 | −51 | 1080 |
| 3 | 10.0 | 2.5 | 2.5 | — | | 3891 | 0.8 | 9 × 10$^{13}$ | 20 | 0.9 | 0 | −32 | 1140 |
| *4 | 12.5 | 1.5 | 1.5 | — | | 3311 | 0.6 | 8 × 10$^{13}$ | 19 | 1.1 | −3 | −29 | 1040 |
| 5 | 3.0 | 4.0 | 1.0 | — | | 4027 | 0.7 | 9 × 10$^{13}$ | 13 | 1.9 | 15 | −65 | 920 |
| *6 | 3.0 | 0 | 5.0 | — | | 3833 | 1.1 | 4 × 10$^{13}$ | 14 | 1.4 | −13 | −28 | 940 |
| 7 | 3.0 | 1.0 | 5.0 | — | | 3524 | 0.9 | 7 × 10$^{13}$ | 16 | 0.9 | 5 | −30 | 960 |
| *8 | 3.0 | 3.0 | 0 | — | | 3019 | 0.7 | 1.2 × 10$^{14}$ | 20 | 1.1 | 60 | −10 | 1000 |
| *9 | 3.0 | 1.5 | 6.0 | — | | 2871 | 0.4 | 9 × 10$^{13}$ | 11 | 1.8 | −2 | −48 | 890 |
| *10 | 3.0 | 5.0 | 1.5 | — | | 3251 | 0.4 | 8 × 10$^{13}$ | 15 | 1.7 | 20 | −20 | 890 |
| 11 | 10.0 | 1.0 | 5.0 | — | | 3173 | 0.6 | 6 × 10$^{13}$ | 12 | 1.3 | −43 | 4 | 1100 |
| 12 | 1.0 | 4.0 | 1.0 | — | | 3994 | 0.7 | 8 × 10$^{13}$ | 18 | 0.4 | 27 | −44 | 900 |
| 13 | 3.0 | 1.5 | 1.5 | $MnO_2$ | 0.3 | 4432 | 0.5 | 1 × 10$^{14}$ | 23 | 0.7 | −3 | −36 | 1020 |
| *14 | 3.0 | 1.5 | 1.5 | $MnO_2$ | 0.6 | 4018 | 0.5 | 9 × 10$^{13}$ | 20 | 0.5 | −10 | −29 | 1050 |
| 15 | 3.0 | 1.5 | 1.5 | $Cr_2O_3$ | 0.3 | 4391 | 1.0 | 8 × 10$^{13}$ | 16 | 1.2 | −15 | −21 | 960 |
| *16 | 3.0 | 1.5 | 1.5 | $Cr_2O_3$ | 0.6 | 3703 | 1.4 | 6 × 10$^{13}$ | 11 | 1.5 | −30 | −15 | 840 |
| 17 | 3.0 | 1.5 | 1.5 | $Fe_2O_3$ | 0.3 | 3917 | 0.9 | 8 × 10$^{13}$ | 21 | 1.4 | −22 | −38 | 940 |
| *18 | 3.0 | 1.5 | 1.5 | $Fe_2O_3$ | 0.6 | 3723 | 0.7 | 4 × 10$^{13}$ | 19 | 0.9 | −14 | −30 | 970 |
| 19 | 3.0 | 1.5 | 1.5 | NiO | 0.3 | 3841 | 1.6 | 7 × 10$^{13}$ | 18 | 3.1 | 8 | −30 | 890 |
| *20 | 3.0 | 1.5 | 1.5 | NiO | 0.6 | 3629 | 2.1 | 1 × 10$^{14}$ | 18 | 2.0 | −2 | −19 | 840 |
| 21 | 3.0 | 1.5 | 1.5 | CoO | 0.3 | 4015 | 0.5 | 9 × 10$^{13}$ | 20 | 1.7 | 14 | −41 | 1090 |
| *22 | 3.0 | 1.5 | 1.5 | CoO | 0.6 | 3140 | 0.4 | 6 × 10$^{13}$ | 19 | 2.0 | 8 | −33 | 1140 |

*Comparison example
Remark: Among the additive composition $MnO_2$ and the like of "other" shows weight % to the main component.

Figure 8:
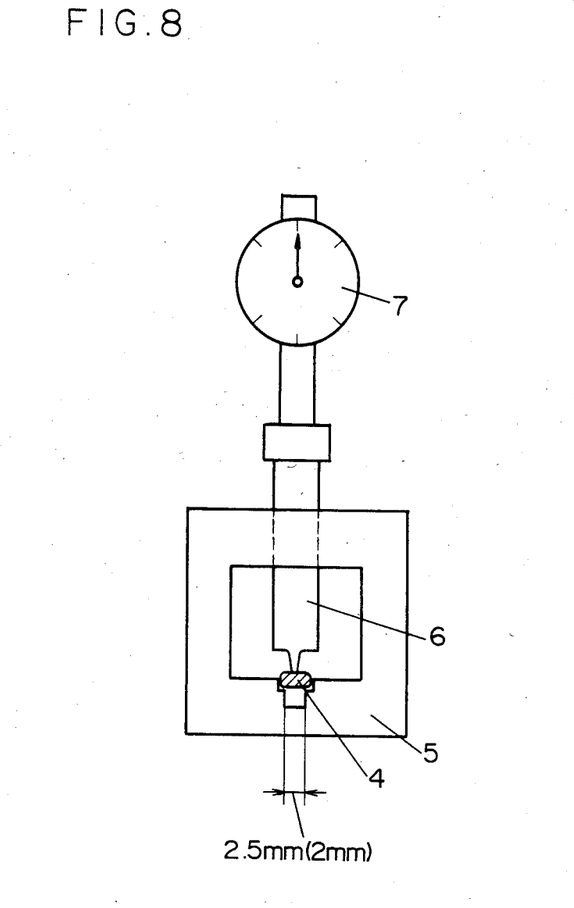
FIG. 8 is a drawing showing an apparatus for examining bending force of the laminated ceramic capacitor made by using the composition of the present invention.

As is obvious from the Table 1, it is observed that the composition of the present invention is small in capacity change by AC voltage, and strong in bending strength.

of 0.5 mm thick edge as shown in FIG. 8. In FIG. 8, 5 is a sample holding table, 6 is a pressing pin and 7 is a tension gauge with a stop pointer arm.

TABLE 2

| | C (pF) | tan $\delta$ (%) | IRe (%) | BDVe (kV) | T C (%) | | Bending strength (Kg) |
|---|---|---|---|---|---|---|---|
| | | | | | −30° C. | +85° C. | |
| Composition of the present invention (No. 13) | 2240 | 0.5 | 8 × 10$^{12}$ | 2.4 | −3.0 | −34.6 | 3.5 |
| Conventional composition group with additive of ($BaZrO_3$) | 2320 | 2.8 | 2 × 10$^{12}$ | 1.6 | 1.3 | −31.2 | 1.8 |

Since in the conventional composition with addition of $BaZrO_3$, $BaSnO_3$ or $SRTiO_3$ the AC voltage characteristic in tan $\delta$ value under 50 V/mm has been so high as about 3-7% and bending strength has been as low as 600-700 Kg/cm$^2$, they are considered a very much satisfactory characteristics.

Figure 1:
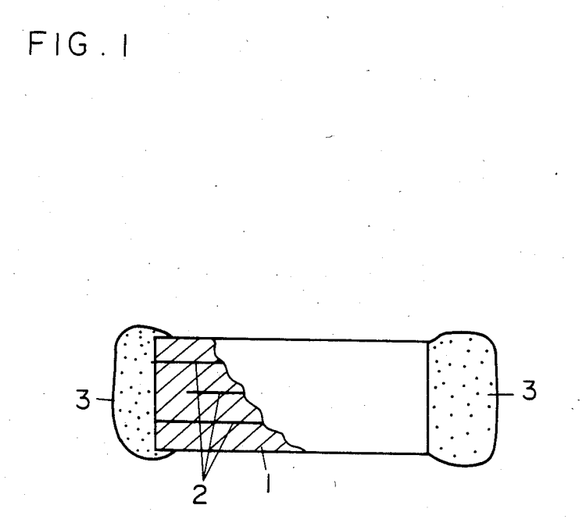
FIG. 1 is a partially sectional front view of a laminated ceramic capacitor trially made by using the ceramic high dielectric composition of the present invention.

Table 2 shows results of characteristics obtained by trially making laminated ceramic capacitor like the one as shown in FIG. 1 by using the composition of the sample No. 13 of the Table 1, and then examining the characteristics.

Figure 2:
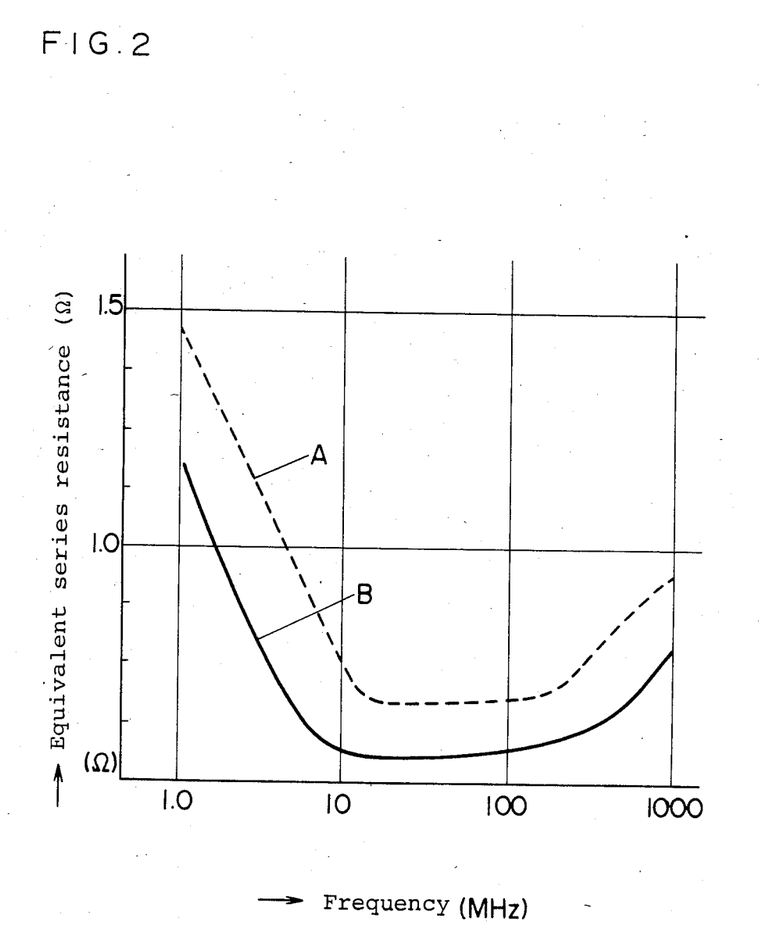
FIG. 2 is a graphs showing frequency characteristic of equivalent series resistance of the laminated ceramic capacitor.
Figure 3:
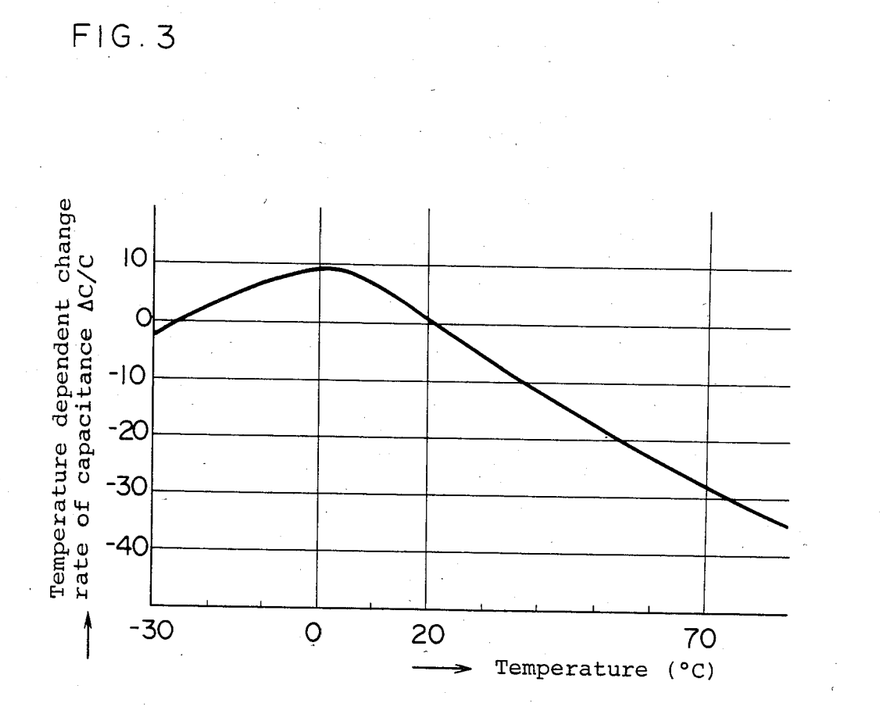
FIG. 3 to FIG. 7 are graphs showing temperature dependent change rates of the same.
Figure 4:
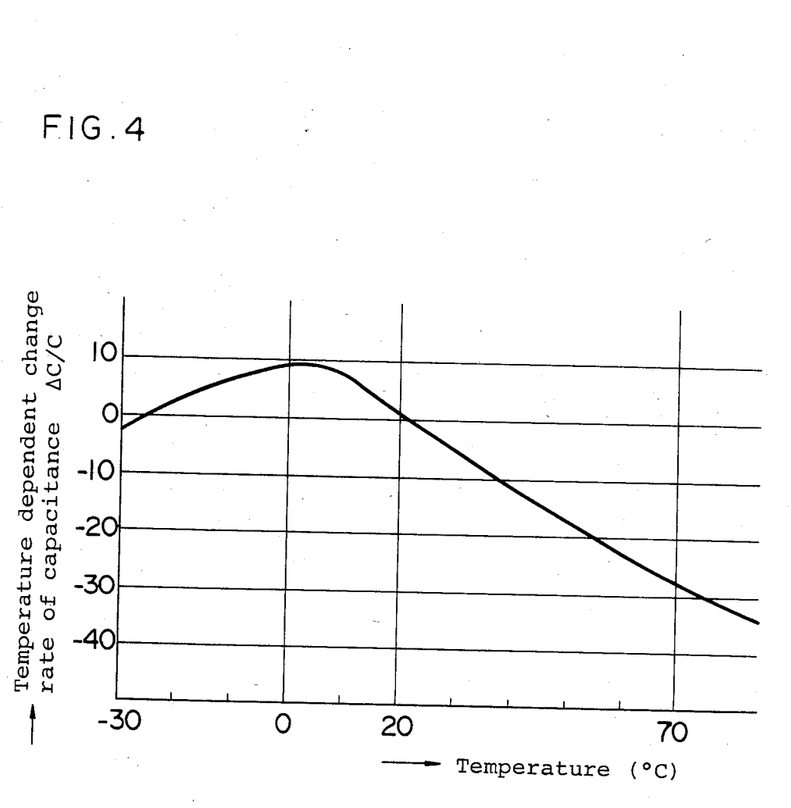
Figure 5:
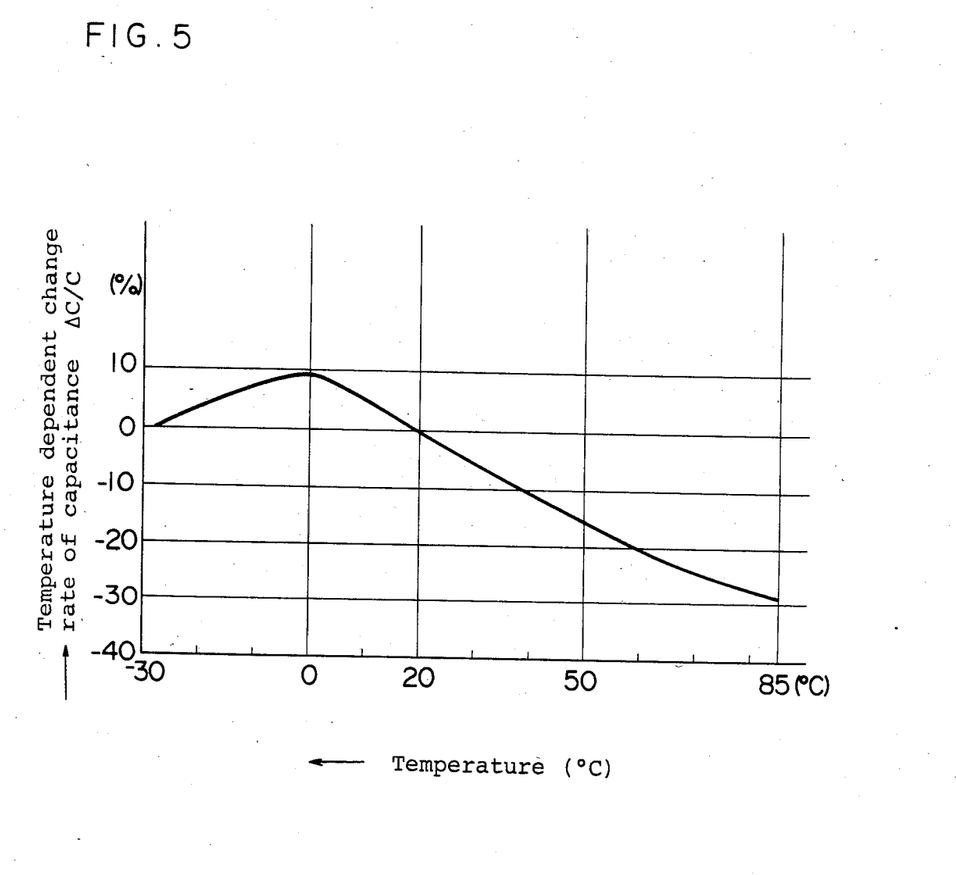
Figure 6:
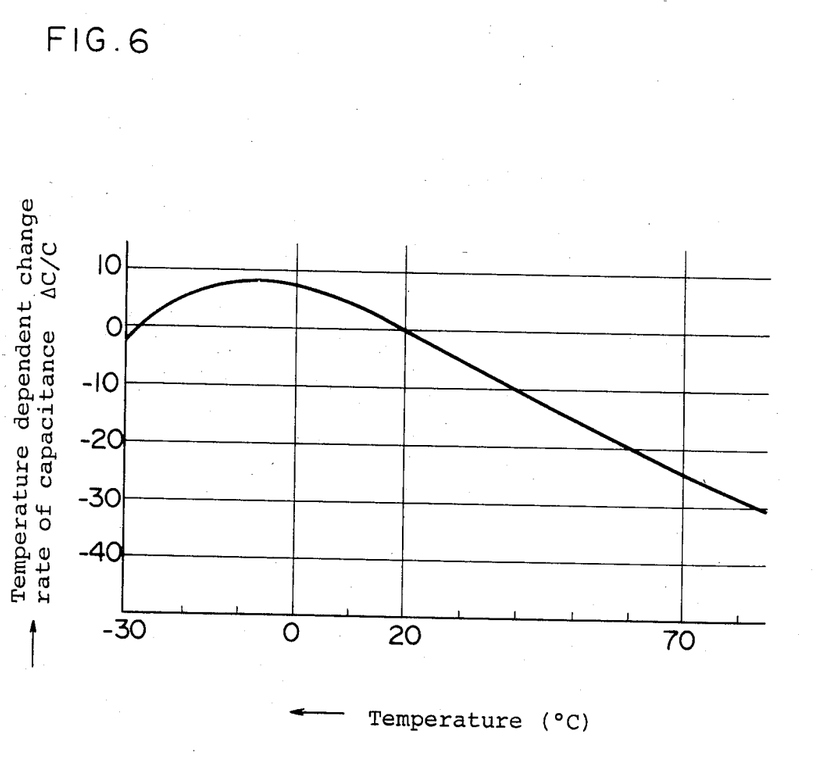
Figure 7:
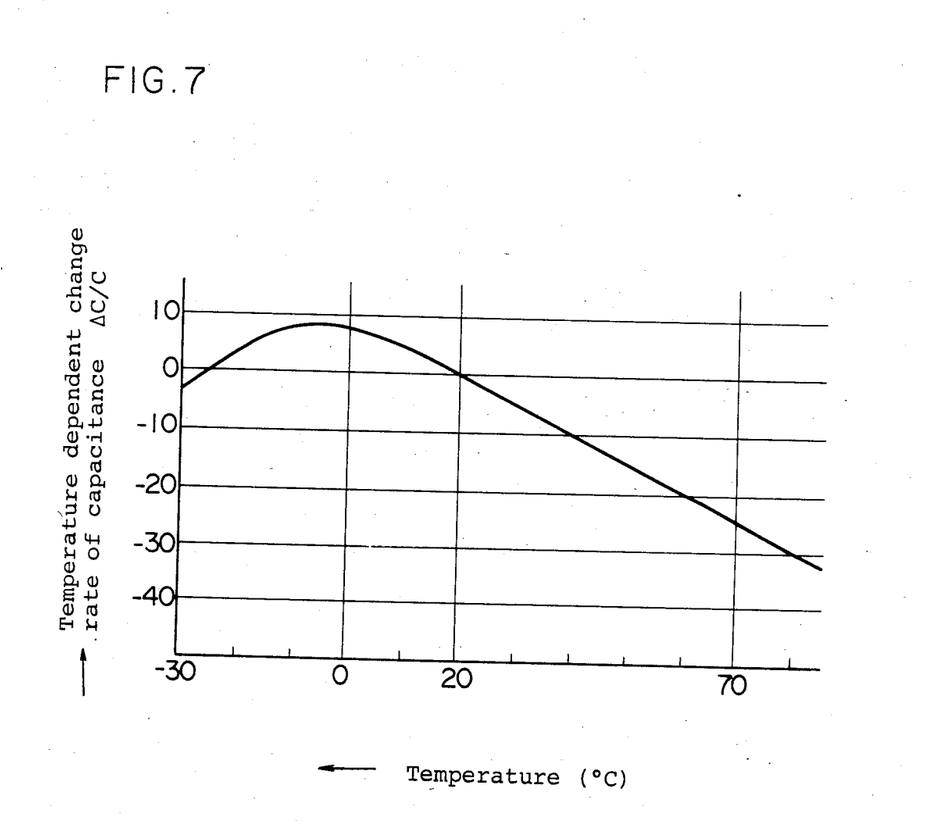

FIG. 2 also shows characteristics of capacitors trially made by using conventional representative composition FIG. 2 shows frequency characteristic of equivalent series resistance of this case. It is clear that as compared with a characteristic A of the capacitor according to the conventional composition, a characteristic B of the capacitor of the present invention trially made by the sample No. 13 has very good characteristic in high frequency range. FIG. 3 also shows temperature change rate of the same capacitor trially made by the present invention.

Nextly, elucidation is made on a second embodiment of the present invention, obtained by that $BaTiO_3$ is host material and $CaTiO_3$, $Sb_2O_3$ and besides, lanthanum oxide ($La_2O_3$) are added to it, and on a third embodiment of the present invention obtained by that $BaTiO_3$ is host material and $CaTiO_3$, $Sb_2O_3$ and besides samarium oxide ($Sm_2O_3$) are added to it. That is, these are a and the condition of preparation is quite the same as that of the embodiments of the above-mentioned first embodiment and the characteristics are measured in the same conditions.

TABLE 3

| No. | Additive composition (weight parts) | | | | | $\epsilon_{25}$ | tan δ (%) | IR (Ω·cm) | BDV (kV/mm) | AC-V (%) | T C (%) | | Constant of bending strength (Kg/cm$^2$) |
|---|---|---|---|---|---|---|---|---|---|---|---|---|---|
| | $CaTiO_3$ | $Sb_2O_3$ | $La_2O_3$ | Other | | | | | | | −30° C. | +85° C. | |
| *1 | 0 | 2.5 | 2.0 | — | | 3847 | 1.0 | $5 \times 10^{13}$ | 11 | 3.5 | 4 | −34 | 840 |
| 2 | 5.0 | 1.5 | 1.5 | — | | 3799 | 0.9 | $6 \times 10^{13}$ | 17 | 1.5 | −2 | −50 | 990 |
| 3 | 10.0 | 2.5 | 2.5 | — | | 3681 | 0.8 | $9 \times 10^{13}$ | 18 | 1.0 | 0 | −48 | 1090 |
| *4 | 12.5 | 1.5 | 2.0 | — | | 3309 | 0.6 | $7 \times 10^{13}$ | 19 | 1.1 | −8 | −36 | 1050 |
| 5 | 3.0 | 4.0 | 1.0 | — | | 3904 | 0.8 | $9 \times 10^{13}$ | 12 | 1.8 | 10 | −84 | 940 |
| *6 | 3.0 | 0 | 5.0 | — | | 3650 | 1.1 | $6 \times 10^{13}$ | 11 | 2.1 | 3 | −42 | 960 |
| 7 | 3.0 | 1.0 | 5.0 | — | | 3687 | 0.9 | $7 \times 10^{13}$ | 13 | 1.0 | 18 | −70 | 960 |
| *8 | 3.0 | 3.0 | 0 | — | | 3019 | 0.7 | $1.2 \times 10^{14}$ | 20 | 1.1 | 60 | −10 | 1000 |
| *9 | 3.0 | 1.5 | 6.0 | — | | 2417 | 0.4 | $8 \times 10^{13}$ | 10 | 2.0 | −2 | −36 | 910 |
| *10 | 3.0 | 5.0 | 1.5 | — | | 3455 | 0.6 | $7 \times 10^{13}$ | 15 | 1.7 | 16 | −27 | 910 |
| 11 | 10.0 | 1.0 | 5.0 | — | | 3004 | 0.7 | $5 \times 10^{13}$ | 10 | 1.8 | −20 | −26 | 960 |
| 12 | 1.0 | 4.0 | 1.0 | — | | 3962 | 0.8 | $8 \times 10^{13}$ | 18 | 0.4 | 24 | −30 | 900 |
| 13 | 3.0 | 1.5 | 1.0 | $MnO_2$ | 0.5 | 4296 | 0.5 | $1 \times 10^{14}$ | 22 | 0.7 | −3 | −34 | 1110 |
| *14 | 3.0 | 1.5 | 1.0 | $MnO_2$ | 0.5 | 3971 | 0.5 | $9 \times 10^{13}$ | 20 | 0.5 | −7 | −29 | 1090 |
| 15 | 3.0 | 1.5 | 1.0 | $Cr_2O_3$ | 0.3 | 4001 | 1.0 | $8 \times 10^{13}$ | 16 | 1.2 | −10 | −25 | 970 |
| *16 | 3.0 | 1.5 | 1.0 | $Cr_2O_3$ | 0.6 | 3602 | 0.8 | $6 \times 10^{13}$ | 11 | 1.6 | −26 | −14 | 870 |
| 17 | 3.0 | 1.5 | 1.0 | $Fe_2O_3$ | 0.3 | 3999 | 0.8 | $8 \times 10^{13}$ | 21 | 1.4 | −30 | −19 | 940 |
| *18 | 3.0 | 1.5 | 1.0 | $Fe_2O_3$ | 0.6 | 3740 | 0.7 | $6 \times 10^{13}$ | 19 | 0.9 | −18 | −30 | 970 |
| 19 | 3.0 | 1.5 | 1.0 | NiO | 0.3 | 3787 | 1.4 | $7 \times 10^{13}$ | 18 | 3.1 | 8 | −36 | 850 |
| *20 | 3.0 | 1.5 | 1.0 | NiO | 0.6 | 3722 | 1.1 | $1 \times 10^{14}$ | 18 | 2.0 | −2 | −24 | 800 |
| 21 | 3.0 | 1.5 | 1.0 | CoO | 0.3 | 4032 | 0.6 | $9 \times 10^{13}$ | 20 | 1.7 | 10 | −28 | 1040 |
| *22 | 3.0 | 1.5 | 1.0 | CoO | 0.6 | 3285 | 0.5 | $6 \times 10^{13}$ | 19 | 2.0 | 4 | −30 | 1090 |

*Comparison example
Remark: Among the additive composition $MnO_2$ and the like of "other" shows weight % to the main component.

TABLE 4

| No. | Additive composition (weight parts) | | | | | $\epsilon_{25}$ | tan δ (%) | IR (Ω·cm) | BDV (kV/mm) | AC-V (%) | T C (%) | | Constant of bending strength (Kg/cm$^2$) |
|---|---|---|---|---|---|---|---|---|---|---|---|---|---|
| | $CaTiO_3$ | $Sb_2O_3$ | $Sm_2O_3$ | Other | | | | | | | −30° C. | +85° C. | |
| *1 | 0 | 2.5 | 2.0 | — | | 4368 | 1.3 | $4 \times 10^{13}$ | 9 | 2.9 | −12 | −43 | 870 |
| 2 | 5.0 | 1.5 | 1.5 | — | | 4140 | 1.0 | $5 \times 10^{13}$ | 12 | 1.4 | −4 | −46 | 1040 |
| 3 | 10.0 | 2.5 | 2.5 | — | | 4203 | 0.8 | $7 \times 10^{13}$ | 18 | 1.3 | 2 | −28 | 1100 |
| *4 | 12.5 | 1.5 | 2.0 | — | | 3108 | 0.6 | $6 \times 10^{13}$ | 19 | 1.0 | 5 | −20 | 1040 |
| 5 | 3.0 | 4.5 | 1.0 | — | | 4270 | 0.9 | $7 \times 10^{13}$ | 14 | 1.7 | 10 | −40 | 920 |
| *6 | 3.0 | 0 | 5.0 | — | | 3882 | 1.1 | $3 \times 10^{13}$ | 14 | 1.6 | −10 | −25 | 940 |
| 7 | 3.0 | 1.0 | 5.0 | — | | 3717 | 0.9 | $5 \times 10^{13}$ | 16 | 1.1 | 3 | −28 | 980 |
| *8 | 3.0 | 3.0 | 0 | — | | 3019 | 0.7 | $12 \times 10^{14}$ | 20 | 1.1 | 60 | −10 | 1000 |
| *9 | 3.0 | 1.5 | 6.0 | — | | 3104 | 0.5 | $9 \times 10^{13}$ | 9 | 1.9 | 1 | −40 | 900 |
| *10 | 3.0 | 5.0 | 1.5 | — | | 3633 | 0.6 | $8 \times 10^{13}$ | 15 | 1.7 | 15 | −18 | 880 |
| 11 | 10.0 | 1.0 | 5.0 | — | | 3591 | 0.8 | $8 \times 10^{13}$ | 13 | 1.4 | −37 | 8 | 1080 |
| 12 | 1.0 | 4.0 | 1.0 | — | | 4087 | 1.0 | $9 \times 10^{13}$ | 18 | 0.6 | 24 | −39 | 900 |
| 13 | 3.0 | 1.5 | 2.0 | $MnO_2$ | 0.3 | 4602 | 0.5 | $11 \times 10^{14}$ | 23 | 0.6 | −1 | −31 | 1050 |
| *14 | 3.0 | 1.5 | 2.0 | $MnO_2$ | 0.6 | 4198 | 0.5 | $9 \times 10^{13}$ | 20 | 0.5 | −8 | −28 | 1080 |
| 15 | 3.0 | 1.5 | 2.0 | $Cr_2O_3$ | 0.3 | 4403 | 1.0 | $7 \times 10^{13}$ | 15 | 1.2 | −15 | −24 | 940 |
| *16 | 3.0 | 1.5 | 2.0 | $Cr_2O_3$ | 0.6 | 3811 | 1.5 | $5 \times 10^{13}$ | 11 | 1.5 | −28 | −19 | 870 |
| 17 | 3.0 | 1.5 | 2.0 | $Fe_2O_3$ | 0.3 | 4029 | 1.1 | $8 \times 10^{13}$ | 18 | 0.9 | −18 | −32 | 940 |
| *18 | 3.0 | 1.5 | 2.0 | $Fe_2O_3$ | 0.6 | 3755 | 0.8 | $5 \times 10^{13}$ | 17 | 0.7 | −9 | −28 | 980 |
| 19 | 3.0 | 1.5 | 2.0 | NiO | 0.3 | 3910 | 1.5 | $8 \times 10^{13}$ | 17 | 2.8 | 11 | −27 | 870 |
| *20 | 3.0 | 1.5 | 2.0 | NiO | 0.6 | 3723 | 2.2 | $1 \times 10^{14}$ | 17 | 1.8 | 1 | −16 | 850 |
| 21 | 3.0 | 1.5 | 2.0 | CoO | 0.3 | 4296 | 0.6 | $9 \times 10^{13}$ | 20 | 1.7 | 17 | −37 | 1120 |
| *22 | 3.0 | 1.5 | 2.0 | CoO | 0.6 | 3509 | 0.5 | $6 \times 10^{13}$ | 18 | 2.0 | 11 | −30 | 1166 |

*Comparison example
Remark: Among the additive composition $MnO_2$ and the like of "other" shows weight % to the main component.

ceramic high dielectric composition formed by adding 1–5 weight parts of $CaTiO_3$, 1–4 weight parts of $Sb_2O_3$ and 1–5 weight parts of $La_2O_3$ to 100 weight parts of $BaTiO_3$, and a ceramic high dielectric composition formed by adding 1–5 weight parts of $CaTiO_3$, 1–4 weight parts of $Sb_2O_3$ and 1–5 weight parts of $Sm_2O_3$ to 100 weight parts of $BaTiO_3$. In these case, 0.01–0.5 wt% of at least one kind of oxides of Mn, Cr, Fe, Ni and Co to the host material may be contained.

The below-mentioned Table 3 and Table 4 show characteristics of sintered bodies obtained for the various additive compositions in the second embodiments;

Nextly, elucidation is made on a fourth embodiment of the present invention wherein $BaTiO_3$ is host material and $CaTiO_3$, $Ta_2O_5$ and further antimony sesquioxide ($Sb_2O_3$) are added to it, and a fifth embodiment of the present invention wherein $BaTiO_3$ is a host material and $CaTiO_3$, $Ta_2O_5$ and further praseodymium oxide $Pr_6O_{11}$ are added to it. That is, these are a ceramic high dielectric composition formed by adding 1–5 weight parts of $CaTiO_3$, 1–4 weight parts of $Ta_2O_5$ and 1–5 weight parts of $Sb_2O_3$ to 100 weight parts of $BaTiO_3$, and a ceramic high dielectric composition formed by adding 1–5 weight parts of $CaTiO_3$, 1–4 weight parts of $Ta_2O_5$ and 1-4 weight parts of $Pr_6O_{11}$ to 100 weight parts of $BaTiO_3$. Also in these cases, 0.01-0.5% by weight of at least one kind of oxide of Mn, Cr, Fe, Ni and Co to the host material may be contained.

The below-mentioned Table 5 and Table 6 show characteristics of sintered bodies obtained for the various additive compositions in the fourth and fifth embodiments, and the conditions are quite the same as that of the embodiment of the above-mentioned first embodiment and the characteristics are measured under the same conditions.

As is obvious from the Table 3-Table 6, it is observed that also for the compositions of the second embodiments through fifth embodiments, like the first embodiment, the dielectric constant is large, capacity change depending on AC voltage is small and bending strength is great. Hereupon, though in the second through fifth embodiments, the only such cases have been illustrated that as shown in Table 3 to Table 6 each one kind of $MnO_2$, $Cr_2O_3$, $Fe_2O_3$, NiO and CoO as the additive composition has been included to the host material, but the inventors confirmed that similar effect is obtainable

TABLE 5

| No. | Additive composition (weight parts) | | | | | $\epsilon_{25}$ | tan δ (%) | IR (Ω·cm) | BDV (kV/mm) | AC-V (%) | T C (%) | | Constant of bending strength (Kg/cm²) |
|---|---|---|---|---|---|---|---|---|---|---|---|---|---|
| | $CaTiO_3$ | $Ta_2O_5$ | $Sb_2O_3$ | Other | | | | | | | −30° C. | +85° C. | |
| *1 | 0 | 2.5 | 1.5 | — | | 3493 | 1.0 | $5 \times 10^{13}$ | 10 | 3.0 | −15 | −52 | 950 |
| 2 | 3.0 | 2.0 | 1.5 | — | | 3043 | 0.7 | $4 \times 10^{13}$ | 12 | 2.7 | 0 | −28.2 | 930 |
| 3 | 3.0 | 4.0 | 1.0 | — | | 3524 | 1.2 | $3 \times 10^{13}$ | 11 | 1.0 | −2.0 | −35.3 | 970 |
| 4 | 3.0 | 5.0 | 5.0 | — | | 4073 | 0.9 | $7 \times 10^{13}$ | 12 | 1.6 | −8.5 | −39.4 | 1030 |
| 5 | 10.0 | 2.0 | 1.0 | — | | 2830 | 0.8 | $6 \times 10^{13}$ | 16 | 1.2 | −6.2 | −40.3 | 950 |
| *6 | 12.5 | 2.0 | 1.5 | — | | 2127 | 0.8 | $9 \times 10^{13}$ | 19 | 1.8 | −23.4 | −65.8 | 930 |
| *7 | 3.0 | 0 | 5.0 | — | | Not be sintered | — | — | — | — | — | — | — |
| 8 | 2.0 | 1.0 | 5.0 | — | | 3346 | 0.2 | $3 \times 10^{13}$ | 12 | 1.9 | −6.4 | −38.4 | 740 |
| *9 | 3.0 | 2.0 | 0 | — | | 4453 | 1.3 | $9 \times 10^{13}$ | 13 | 2.0 | −7.4 | −75.4 | 860 |
| *10 | 3.0 | 5.0 | 6.0 | — | | 4528 | 1.5 | $2 \times 10^{13}$ | 17 | 1.8 | −60.4 | −32.4 | 1020 |
| *11 | 3.0 | 6.0 | 1.5 | — | | 1870 | 0.6 | $6 \times 10^{13}$ | 15 | 2.5 | −54.5 | −30.4 | 980 |
| 12 | 10.0 | 1.0 | 5.0 | — | | 2982 | 0.7 | $4 \times 10^{13}$ | 18 | 1.6 | −36 | −30 | 1000 |
| 13 | 1.0 | 10.0 | 1.0 | — | | 3573 | 0.9 | $5 \times 10^{13}$ | 19 | 1.8 | −45 | −28 | 980 |
| 14 | 3.0 | 2.0 | 1.5 | $MnO_2$ | 0.3 | 3973 | 0.8 | $8 \times 10^{13}$ | 15 | 1.2 | −3.2 | −30 | 1100 |
| *15 | 3.0 | 2.0 | 1.5 | $MnO_2$ | 0.6 | 3465 | 0.6 | $8 \times 10^{13}$ | 14 | 1.0 | −7.5 | −27 | 1050 |
| 16 | 3.0 | 2.0 | 1.5 | $Cr_2O_3$ | 0.3 | 3326 | 0.9 | $9 \times 10^{13}$ | 17 | 1.5 | −6 | −27 | 1120 |
| *17 | 3.0 | 2.0 | 1.5 | $Cr_2O_3$ | 0.6 | 2178 | 0.4 | $6 \times 10^{13}$ | 18 | 0.9 | −8 | −26 | 1220 |
| 18 | 3.0 | 2.0 | 1.5 | $Fe_2O_3$ | 0.3 | 3289 | 0.8 | $5 \times 10^{13}$ | 16 | 1.8 | −13 | −34 | 1070 |
| 19 | 3.0 | 2.0 | 1.5 | $Fe_2O_3$ | 0.6 | 3065 | 0.7 | $7 \times 10^{13}$ | 15 | 1.6 | −17 | −30 | 1050 |
| 20 | 3.0 | 2.0 | 1.5 | NiO | 0.3 | 3342 | 0.5 | $4 \times 10^{13}$ | 13 | 1.2 | −15 | −38 | 1010 |
| 21 | 3.0 | 2.0 | 1.5 | NiO | 0.6 | 3384 | 0.7 | $2 \times 10^{13}$ | 17 | 1.4 | −20 | −40 | 1080 |
| 22 | 3.0 | 2.0 | 1.5 | CoO | 0.3 | 3201 | 0.9 | $6 \times 10^{13}$ | 11 | 2.0 | −10 | −35 | 1040 |
| 23 | 3.0 | 2.0 | 1.5 | CoO | 0.6 | 3052 | 0.6 | $5 \times 10^{13}$ | 13 | 1.8 | −15 | −33 | 960 |

*Comparison example
Remark: Among the additive composition $MnO_2$ and the like of "other" shows weight % to the main component.

TABLE 6

| No. | Additive composition (weight parts) | | | | | $\epsilon_{25}$ | tan δ (%) | IR (Ω·cm) | BDV (kV/mm) | AC-V (%) | T C (%) | | Constant of bending strength (Kg/cm²) |
|---|---|---|---|---|---|---|---|---|---|---|---|---|---|
| | $CaTiO_3$ | $Ta_2O_5$ | $Pr_6O_{11}$ | Other | | | | | | | −30° C. | +85° C. | |
| *1 | 0 | 2.5 | 1.5 | — | | 3760 | 1.2 | $2 \times 10^{13}$ | 11 | 3.5 | −10 | −35 | 970 |
| 2 | 3.0 | 2.0 | 1.5 | — | | 3476 | 0.7 | $2 \times 10^{13}$ | 14 | 1.3 | −20 | −31 | 1030 |
| 3 | 3.0 | 4.0 | 1.0 | — | | 3698 | 1.1 | $5 \times 10^{13}$ | 12 | 1.9 | −3 | −23 | 990 |
| 4 | 3.0 | 5.0 | 5.0 | — | | 2740 | 0.7 | $7 \times 10^{13}$ | 13 | 1.4 | 4 | −44 | 850 |
| 5 | 10.0 | 2.0 | 1.0 | — | | 2978 | 0.9 | $2 \times 10^{13}$ | 14 | 1.5 | −5 | −33 | 980 |
| *6 | 12.5 | 2.0 | 1.0 | — | | 2484 | 0.6 | $8 \times 10^{13}$ | 17 | 1.2 | −2 | −24 | 1020 |
| *7 | 3.0 | 0 | 5.0 | — | | Not be sintered | — | — | — | — | — | — | — |
| 8 | 2.0 | 1.0 | 5.0 | — | | 3597 | 1.0 | $6 \times 10^{13}$ | 14 | 1.7 | −3 | −42 | 980 |
| *9 | 3.0 | 2.0 | 0 | — | | 3324 | 0.9 | $3 \times 10^{13}$ | 11 | 1.6 | −10 | −24 | 900 |
| *10 | 3.0 | 5.0 | 6.0 | — | | 2127 | 0.7 | $7 \times 10^{13}$ | 10 | 1.4 | 8 | −64 | 630 |
| *11 | 3.0 | 6.0 | 1.5 | — | | 2874 | 0.8 | $6 \times 10^{13}$ | 15 | 1.5 | 3 | −54 | 620 |
| 12 | 10.0 | 1.0 | 5.0 | — | | 3079 | 0.7 | $4 \times 10^{13}$ | 16 | 1.3 | −2 | −41 | 1010 |
| 13 | 1.0 | 10.0 | 1.0 | — | | 3522 | 1.1 | $8 \times 10^{13}$ | 16 | 1.9 | −3 | −35 | 930 |
| 14 | 3.0 | 2.0 | 1.5 | $MnO_2$ | 0.3 | 3381 | 0.8 | $9 \times 10^{13}$ | 19 | 1.6 | −4 | −29 | 1190 |
| *15 | 3.0 | 2.0 | 1.5 | $MnO_2$ | 0.6 | 3125 | 0.6 | $5 \times 10^{13}$ | 20 | 1.2 | −6 | −24 | 1100 |
| 16 | 3.0 | 2.0 | 1.5 | $Cr_2O_3$ | 0.3 | 3134 | 0.7 | $8 \times 10^{13}$ | 21 | 1.6 | −2 | −33 | 1250 |
| *17 | 3.0 | 2.0 | 1.5 | $Cr_2O_3$ | 0.6 | 2838 | 0.5 | $7 \times 10^{13}$ | 18 | 1.0 | −6 | −29 | 1040 |
| 18 | 3.0 | 2.0 | 1.5 | $Fe_2O_3$ | 0.3 | 3254 | 1.0 | $9 \times 10^{13}$ | 20 | 1.9 | −13 | −33 | 1080 |
| *19 | 3.0 | 2.0 | 1.5 | $Fe_2O_3$ | 0.6 | 3056 | 0.9 | $7 \times 10^{13}$ | 18 | 1.4 | −15 | −29 | 1000 |
| 20 | 3.0 | 2.0 | 1.5 | NiO | 0.3 | 3340 | 0.7 | $3 \times 10^{13}$ | 19 | 1.4 | −8 | −35 | 1050 |
| *21 | 3.0 | 2.0 | 1.5 | NiO | 0.6 | 3276 | 1.8 | $5 \times 10^{13}$ | 17 | 3.5 | −2 | −48 | 980 |
| 22 | 3.0 | 2.0 | 1.5 | CoO | 0.3 | 3115 | 1.1 | $2 \times 10^{13}$ | 18 | 1.6 | −12 | −32 | 970 |
| *23 | 3.0 | 2.0 | 1.5 | CoO | 0.6 | 3048 | 1.6 | $2 \times 10^{13}$ | 14 | 2.2 | −10 | −44 | 990 |

*Comparison example
Remark: Among the additive composition $MnO_2$ and the like of "other" shows weight % to the main component.

even when two kinds or more of these oxides are combined and included. In that case, it is similar to the above-mentioned embodiments that when the additive amount to the host material is included exceeding 0.5 weight % the characteristic of $\epsilon_{25}$ is deteriorated. Also, the inventor confirmed that by inclusion of 0.01 weight % or more (0.5 weight % or smaller) of at least one kind of oxide of Mn, Cr, Fe, Ni and Co to the host material, the compositions of the above-mentioned second through fifth embodiments have the similar effect as the characteristics shown in the Table 3 through Table 6. Also, composition of the samples No. 13 of the Table 3 and Table 4 and composition of sample No. 14 of the Table 5, and composition of sample 15 of Table 6 are respectively used and the above-mentioned laminated ceramic capacitors were trially made, and their characteristics were examined, and the results are shown on the below-mentioned Table 7. In this case the sizes of the element were similar to the embodiment of the first embodiment, and the characteristics were measured also under the same conditions.

compounds of the present invention. That is, these are ceramic high dielectric compounds made by adding 1-5 weight parts of $CaTiO_3$, 1-4 weight parts of $Sb_2O_3$, 1-5 weight parts of $Nd_2O_3$ and 0.1-1 weight parts of $SiO_2$ to 100 weight parts of $BaTiO_3$, ceramic high dielectric compounds made by adding 1-5 weight parts of $CaTiO_3$, 1-4 weight parts of $Sb_2O_3$, 1-5 weight parts of $La_2O_3$ and 0.1-1 weight parts of $SiO_2$ to 1-5 weight parts of $BaTiO_3$, ceramic high dielectric compounds made by adding 1-5 weight parts of $CaTiO_3$, 1-4 weight parts of $Sb_2O_3$, 1-5 weight parts of $Sm_2O_3$ and 0.1-1 weight parts of $SiO_2$ to 100 weight parts of $BaTiO_3$, ceramic high dielectric compounds made by adding 1-5 weight parts of $CaTiO_3$, 1-4 weight parts of $Ta_2O_5$ 1-5 weight parts of $Sb_2O_3$ and 0.1-1 weight parts of $SiO_2$ to 100 weight parts of $BaTiO_3$ and ceramic high dielectric compounds made by adding 1-5 weight parts of $CaTiO_3$, 1-4 weight parts of $Ta_2O_3$, 1-5 weight parts of $Pr_6O_{11}$ and 0.1-1 weight parts of $SiO_2$ to 100 weight parts of $BaTiO_3$. In these cases, at least one kind of oxides of Mn, Cr, Fe, Ni and Co may be included at a

TABLE 7

|  | C (pF) | tan δ (%) | IRe (Ω) | BDVe (kV) | T C (%) −30° C. | T C (%) +85° C. | Bending strength (Kg) |
| --- | --- | --- | --- | --- | --- | --- | --- |
| Second embodiment Sample No. 13 of Table 3 | 2240 | 0.5 | $8 \times 10^{12}$ | 2.4 | −3.0 | −34.6 | 3.7 |
| Third embodiment Sample No. 13 of Table 4 | 2410 | 0.5 | $8 \times 10^{12}$ | 2.3 | −1.0 | −29.4 | 3.4 |
| Fourth embodiment Sample No. 14 of Table 5 | 2250 | 0.8 | $5 \times 10^{12}$ | 2.0 | −2.5 | −30.5 | 3.3 |
| Fifth embodiment Sample No. 15 of Table 6 | 2265 | 0.9 | $6 \times 10^{12}$ | 2.1 | −1.4 | −31.5 | 3.4 |

Frequency characteristic of the equivalent series resistance in this case is, like the above-described first embodiment, was confirmed as very good characteristics of high frequency in comparison with the characteristic A of the capacitor of the conventional component (composition of the group with additive of the above-described $BaZrO_3$).

FIG. 4 through FIG. 7 similarly show temperature change ratio of capacitance of the capacitors trially made with the compositions of the second through fifth embodiments.

Nextly, explains are made on sixth through tenth embodiments of the present invention which are to be obtained by adding $SiO_2$ further to the first to fifth rate of 0.01-0.5 wt% to the host material. The below-mentioned Tables 8 through Table 12 show results of examinations of characteristics of laminated ceramic capacitors which are trially made for the variously added compositions of the sixth through tenth embodiments. In this case sizes of elements are similar to the first embodiment. The bending force was pressures which was immediately before the element destruction when the element 4 was supported with 2.0 mm span and the central part of the element 4 was pressed with a knife of 0.5 mm edge width as shown in FIG. 12. C and tan δ and IRe were measured under the same condition as that of the embodiment of FIG. 1.

TABLE 8

| No. | Additive composition (weight parts) | | | | | Bending strength (Kg) | Capacitance (pF) | tan δ (%) | IR (Ω) |
| --- | --- | --- | --- | --- | --- | --- | --- | --- | --- |
|  | $CaTiO_3$ | $Sb_2O_3$ | $Nd_2O_3$ | $SiO_2$ | Other |  |  |  |  |
| *1 | 0 | 2.5 | 2.5 | 0.5 | — | 2.0 | 2412 | 1.9 | $10^{12}$ |
| 2 | 5. | 1.5 | 1.5 | 0.5 | — | 2.5 | 2345 | 1.7 | $10^{12}$ |
| 3 | 10.0 | 2.5 | 2.5 | 0.3 | — | 2.6 | 2380 | 1.7 | $10^{12}$ |
| *4 | 12.5 | 1.5 | 1.5 | 0.5 | — | 2.3 | 2011 | 1.4 | $10^{12}$ |
| 5 | 3.0 | 4.0 | 1.0 | 0.3 | — | 2.3 | 2421 | 1.4 | $10^{12}$ |
| *6 | 3.0 | 0 | 5.0 | 0.7 | — | 2.4 | 2325 | 2.1 | $10^{12}$ |
| 7 | 3.0 | 1.0 | 5.0 | 0.7 | — | 2.4 | 2287 | 1.8 | $10^{12}$ |
| *8 | 3.0 | 1.0 | 5.0 | 1.1 | — | 2.0 | 1633 | 1.9 | $10^{12}$ |
| *9 | 3.0 | 3.0 | 0 | 0.5 | — | 2.5 | 1946 | 1.6 | $10^{12}$ |
| *10 | 3.0 | 1.5 | 6.0 | 0.5 | — | 2.2 | 1819 | 1.2 | $10^{12}$ |
| *11 | 3.0 | 5.0 | 1.5 | 0.5 | — | 2.2 | 2014 | 1.2 | $10^{12}$ |
| *12 | 3.0 | 1.0 | 1.5 | 0 | — | 2.6 | 2400 | 1.5 | $10^{12}$ |

TABLE 8-continued

| | Additive composition (weight parts) | | | | | Bending strength | Capacitance | tan δ | IR |
|---|---|---|---|---|---|---|---|---|---|
| No. | $CaTiO_3$ | $Sb_2O_3$ | $Nd_2O_3$ | $SiO_2$ | Other | (Kg) | (pF) | (%) | (Ω) |
| 13 | 3.0 | 1.5 | 1.0 | 1.0 | — | 2.3 | 2217 | 1.8 | $10^{12}$ |
| 14 | 3.0 | 1.5 | 4.0 | 0.1 | — | 2.7 | 2131 | 1.4 | $10^{12}$ |
| 15 | 3.0 | 1.5 | 1.5 | 0.1 | — | 2.7 | 2333 | 1.5 | $10^{12}$ |
| 16 | 3.0 | 1.5 | 1.5 | 0.3 | — | 2.8 | 2437 | 1.6 | $10^{12}$ |
| 17 | 3.0 | 1.5 | 1.5 | 0.5 | — | 2.7 | 2378 | 1.6 | $10^{12}$ |
| 18 | 3.0 | 1.5 | 1.5 | 0.7 | — | 2.6 | 2285 | 1.6 | $10^{12}$ |
| 19 | 3.0 | 1.5 | 1.5 | 1.0 | — | 2.6 | 2194 | 1.6 | $10^{12}$ |
| 20 | 3.0 | 1.5 | 1.5 | 0.5 | — | 2.5 | 2209 | 1.4 | $10^{12}$ |
| 21 | 3.0 | 1.5 | 1.5 | 0.3 | $MnO_2$ 0.3 | 2.8 | 2396 | 1.5 | $10^{12}$ |
| *22 | 3.0 | 1.5 | 1.5 | 0.3 | $MnO_2$ 0.6 | 2.6 | 2127 | 1.5 | $10^{12}$ |
| 23 | 3.0 | 1.5 | 1.5 | 0.3 | $Cr_2O_3$ 0.3 | 2.7 | 2328 | 1.6 | $10^{12}$ |
| *24 | 3.0 | 1.5 | 1.5 | 0.3 | $Cr_2O_3$ 0.6 | 2.4 | 2164 | 1.7 | $10^{12}$ |
| 25 | 3.0 | 1.5 | 1.5 | 0.3 | $Fe_2O_3$ 0.3 | 2.5 | 2287 | 1.8 | $10^{12}$ |
| *26 | 3.0 | 1.5 | 1.5 | 0.3 | $Fe_2O_3$ 0.6 | 2.6 | 2215 | 1.6 | $10^{12}$ |
| 27 | 3.0 | 1.5 | 1.5 | 0.3 | NiO 0.3 | 2.4 | 2304 | 2.0 | $10^{12}$ |
| *28 | 3.0 | 1.5 | 1.5 | 0.3 | NiO 0.6 | 2.3 | 2173 | 1.8 | $10^{12}$ |
| 29 | 3.0 | 1.5 | 1.5 | 0.3 | CoO 0.3 | 2.5 | 2389 | 1.6 | $10^{12}$ |
| *30 | 3.0 | 1.5 | 1.5 | 0.3 | CoO 0.6 | 2.6 | 2332 | 1.4 | $10^{12}$ |

*Comparison example
Remark: Among the additive composition $MnO_2$ and the like of "other" shows weight % to the main component.

TABLE 9

| | Additive composition (weight parts) | | | | | Bending strength | Capacitance | tan δ | IR |
|---|---|---|---|---|---|---|---|---|---|
| No. | $CaTiO_3$ | $Sb_2O_3$ | $La_2O_3$ | $SiO_2$ | Other | (Kg) | (pF) | (%) | (Ω) |
| *1 | 0 | 2.5 | 2.0 | 0.5 | — | 1.9 | 2139 | 1.7 | $10^{12}$ |
| 2 | 15.0 | 1.5 | 1.5 | 0.5 | — | 2.3 | 2102 | 1.7 | $10^{12}$ |
| 3 | 10.0 | 2.5 | 2.5 | 0.5 | — | 2.5 | 2070 | 1.6 | $10^{12}$ |
| *4 | 2.5 | 1.5 | 2.0 | 0.5 | — | 2.4 | 1871 | 1.4 | $10^{12}$ |
| 5 | 3.0 | 4.0 | 1.0 | 0.3 | — | 2.2 | 2113 | 1.6 | $10^{12}$ |
| *6 | 3.0 | 0 | 5.0 | 0.5 | — | 2.3 | 2065 | 1.9 | $10^{12}$ |
| 7 | 3.0 | 1.0 | 5.0 | 0.5 | — | 2.3 | 2072 | 1.7 | $10^{12}$ |
| *8 | 3.0 | 3.0 | 0 | 0.5 | — | 2.4 | 1694 | 1.5 | $10^{12}$ |
| *9 | 3.0 | 1.5 | 6.0 | 0.5 | — | 2.3 | 1336 | 1.3 | $10^{12}$ |
| *10 | 3.0 | 5.0 | 1.5 | 0.5 | — | 2.3 | 1986 | 1.4 | $10^{12}$ |
| *11 | 3.0 | 1.0 | 5.0 | 1.1 | — | 2.5 | 1595 | 1.6 | $10^{12}$ |
| *12 | 3.0 | 1.5 | 1.0 | 0 | — | 2.5 | 2162 | 1.5 | $10^{12}$ |
| 13 | 0.0 | 1.0 | 5.0 | 0.5 | — | 2.4 | 1624 | 1.4 | $10^{12}$ |
| 14 | 1.0 | 4.0 | 1.0 | 0.5 | — | 2.3 | 2153 | 1.6 | $10^{12}$ |
| 15 | 7.0 | 1.5 | 1.0 | 0.5 | — | 2.4 | 2061 | 1.6 | $10^{12}$ |
| 16 | 3.0 | 1.5 | 1.0 | 0.1 | — | 2.6 | 2142 | 1.5 | $10^{12}$ |
| 17 | 3.0 | 1.5 | 1.0 | 0.3 | — | 2.6 | 2128 | 1.5 | $10^{12}$ |
| 18 | 3.0 | 1.5 | 1.0 | 0.5 | — | 2.7 | 2090 | 1.4 | $10^{12}$ |
| 19 | 3.0 | 1.5 | 1.0 | 0.7 | — | 2.8 | 2012 | 1.4 | $10^{12}$ |
| 20 | 3.0 | 1.5 | 1.0 | 1.0 | — | 2.8 | 1943 | 1.4 | $10^{12}$ |
| 21 | 3.0 | 1.5 | 1.0 | 0.5 | $MnO_2$ 0.3 | 2.8 | 2256 | 1.6 | $10^{12}$ |
| 22 | 3.0 | 1.5 | 1.0 | 0.5 | $MnO_2$ 0.6 | 2.6 | 2099 | 1.6 | $10^{12}$ |
| 23 | 3.0 | 1.5 | 1.0 | 0.5 | $Cr_2O_3$ 0.3 | 2.4 | 2108 | 1.8 | $10^{12}$ |
| 24 | 3.0 | 1.5 | 1.0 | 0.5 | $Cr_2O_3$ 0.6 | 2.0 | 2021 | 1.6 | $10^{12}$ |
| 25 | 3.0 | 1.5 | 1.0 | 0.5 | $Fe_2O_3$ 0.3 | 2.4 | 2130 | 1.6 | $10^{12}$ |
| 26 | 3.0 | 1.5 | 1.0 | 0.5 | $Fe_2O_3$ 0.6 | 2.5 | 2025 | 1.6 | $10^{12}$ |
| 27 | 3.0 | 1.5 | 1.0 | 0.5 | NiO 0.3 | 2.0 | 2088 | 2.0 | $10^{12}$ |
| 28 | 3.0 | 1.5 | 1.0 | 0.5 | NiO 0.6 | 1.9 | 2019 | 1.8 | $10^{12}$ |
| 29 | 3.0 | 1.5 | 1.0 | 0.5 | CoO 0.3 | 2.5 | 2104 | 1.4 | $10^{12}$ |
| 30 | 3.0 | 1.5 | 1.0 | 0.5 | CoO 0.6 | 2.6 | 1692 | 1.2 | $10^{12}$ |

*Comparison example
Remark: Among the additive composition $MnO_2$ and the like of "other" shows weight % to the main component.

TABLE 10

| | Additive composition (weight parts) | | | | | Bending strength | Capacitance | tan δ | IR |
|---|---|---|---|---|---|---|---|---|---|
| No. | $CaTiO_3$ | $Sb_2O_3$ | $Sm_2O_3$ | $SiO_2$ | Other | (Kg) | (pF) | (%) | (Ω) |
| *1 | 0 | 2.5 | 2.0 | 0.5 | — | 2.1 | 2345 | 2.0 | $10^{12}$ |
| 2 | 5.0 | 1.5 | 1.5 | 0.5 | — | 2.4 | 2198 | 1.7 | $10^{12}$ |
| 3 | 10.0 | 2.5 | 2.5 | 0.5 | — | 2.6 | 2229 | 1.6 | $10^{12}$ |
| *4 | 12.5 | 1.5 | 2.0 | 0.5 | — | 2.5 | 1481 | 1.4 | $10^{12}$ |
| 5 | 3.0 | 4.0 | 1.0 | 0.3 | — | 2.3 | 2245 | 1.7 | $10^{12}$ |
| *6 | 3.0 | 0 | 5.0 | 0.3 | — | 2.3 | 2063 | 1.9 | $10^{12}$ |
| 7 | 3.0 | 1.0 | 5.0 | 0.3 | — | 2.5 | 2024 | 1.7 | $10^{12}$ |
| *8 | 3.0 | 3.0 | 0 | 0.3 | — | 2.6 | 1402 | 1.6 | $10^{12}$ |
| 9 | 3.0 | 1.5 | 6.0 | 0.3 | — | 2.4 | 1487 | 1.3 | $10^{12}$ |
| 10 | 3.0 | 5.0 | 1.5 | 0.5 | — | 2.4 | 1911 | 1.6 | $10^{12}$ |
| 11 | 3.0 | 1.0 | 5.0 | 1.1 | — | 2.7 | 1874 | 1.7 | $10^{12}$ |

TABLE 10-continued

| No. | CaTiO₃ | Sb₂O₃ | Sm₂O₃ | SiO₂ | Other | | Bending strength (Kg) | Capacitance (pF) | tan δ (%) | IR (Ω) |
|---|---|---|---|---|---|---|---|---|---|---|
| 12 | 3.0 | 1.5 | 2.0 | 0 | — | | 2.4 | 2168 | 1.6 | 10¹² |
| 13 | 10.0 | 1.0 | 5.0 | 0.5 | — | | 2.6 | 1903 | 1.6 | 10¹² |
| 14 | 1.0 | 4.0 | 2.0 | 0.5 | — | | 2.4 | 2119 | 1.8 | 10¹² |
| 15 | 7.0 | 1.5 | 2.0 | 0.3 | — | | 2.5 | 2142 | 1.6 | 10¹² |
| 16 | 3.0 | 1.5 | 2.0 | 0.1 | — | | 2.5 | 2142 | 1.6 | 10¹² |
| 17 | 3.0 | 1.5 | 2.0 | 0.3 | — | | 2.7 | 2128 | 1.6 | 10¹² |
| 18 | 3.0 | 1.5 | 2.0 | 0.5 | — | | 2.7 | 2103 | 1.5 | 10¹² |
| 19 | 3.0 | 1.5 | 2.0 | 0.7 | — | | 2.6 | 2044 | 1.5 | 10¹² |
| 20 | 3.0 | 1.5 | 2.0 | 1.0 | — | | 2.6 | 1857 | 1.5 | 10¹² |
| 21 | 3.0 | 1.5 | 2.0 | 0.3 | MnO₂ | 0.3 | 2.5 | 2433 | 1.2 | 10¹² |
| 22 | 3.0 | 1.5 | 2.0 | 0.3 | MnO₂ | 0.6 | 2.5 | 2186 | 1.2 | 10¹² |
| 23 | 3.0 | 1.5 | 2.0 | 0.3 | Cr₂O₃ | 0.3 | 2.4 | 2383 | 1.8 | 10¹² |
| 24 | 3.0 | 1.5 | 2.0 | 0.3 | Cr₂O₃ | 0.6 | 2.3 | 1991 | 2.3 | 10¹² |
| 25 | 3.0 | 1.5 | 2.0 | 0.3 | Fe₂O₃ | 0.3 | 2.4 | 2074 | 1.9 | 10¹² |
| 26 | 3.0 | 1.5 | 2.0 | 0.3 | Fe₂O₃ | 0.6 | 2.5 | 1884 | 1.6 | 10¹² |
| 27 | 3.0 | 1.5 | 2.0 | 0.3 | NiO | 0.3 | 2.3 | 2036 | 2.0 | 10¹² |
| 28 | 3.0 | 1.5 | 20 | 0.3 | NiO | 0.6 | 2.3 | 1985 | 2.8 | 10¹² |
| 29 | 3.0 | 1.5 | 20 | 0.3 | CoO | 0.3 | 2.7 | 2345 | 1.4 | 10¹² |
| 30 | 3.0 | 1.5 | 20 | 0.3 | CoO | 0.6 | 2.7 | 1768 | 1.2 | 10¹² |

*Comparison example
Remark: Among the additive composition MnO₂ and the like of "other" shows weight % to the main component.

TABLE 11

| No. | CaTiO₃ | Ta₂O₅ | Sb₂O₃ | SiO₂ | Other | | Bending strength (Kg) | Capacitance (pF) | tan δ (%) | IR (Ω) |
|---|---|---|---|---|---|---|---|---|---|---|
| *1 | 0 | 3.0 | 3.0 | 0.5 | — | | 2.1 | 2572 | 2.0 | 10¹² |
| 2 | 1.0 | 3.0 | 5.0 | 0.7 | — | | 2.2 | 2456 | 1.8 | 10¹² |
| 3 | 3.0 | 5.0 | 3.0 | 1.0 | — | | 2.3 | 2390 | 1.7 | 10¹² |
| 4 | 10.0 | 3.0 | 5.0 | 0.5 | — | | 2.5 | 2115 | 1.8 | 10¹² |
| *5 | 11.0 | 3.0 | 3.0 | 0.3 | — | | 2.4 | 1765 | 1.8 | 10¹² |
| *6 | 3.0 | 0 | 3.0 | 0.5 | — | | Not be sintered | | | |
| 7 | 3.0 | 1.0 | 3.0 | 0.7 | — | | 2.4 | 2387 | 1.8 | 10¹² |
| 8 | 3.0 | 3.0 | 1.0 | 1.0 | — | | 2.5 | 2470 | 1.7 | 10¹² |
| 9 | 3.0 | 5.0 | 5.0 | 0.5 | — | | 2.3 | 2684 | 1.6 | 10¹² |
| *10 | 3.0 | 6.0 | 5.0 | 0.7 | — | | 2.4 | 2890 | 1.8 | 10¹² |
| *11 | 3.0 | 5.0 | 0 | 0.3 | — | | 2.1 | 1623 | 1.8 | 10¹² |
| *12 | 3.0 | 2.0 | 1.0 | 0 | — | | 1.8 | 2105 | 2.0 | 10¹² |
| 13 | 3.0 | 3.0 | 3.0 | 0.3 | — | | 2.2 | 2284 | 1.9 | 10¹² |
| 14 | 3.0 | 3.0 | 5.0 | 0.5 | — | | 2.4 | 2673 | 1.8 | 10¹² |
| *15 | 3.0 | 1.0 | 6.0 | 1.0 | — | | 2.2 | 1686 | 1.8 | 10¹² |
| 16 | 3.0 | 1.0 | 3.0 | 0 | — | | 1.8 | 2240 | 1.9 | 10¹² |
| 17 | 3.0 | 1.0 | 3.0 | 0.1 | — | | 2.1 | 2230 | 1.8 | 10¹² |
| 18 | 3.0 | 1.0 | 3.0 | 0.3 | — | | 2.2 | 2238 | 1.7 | 10¹² |
| 19 | 3.0 | 1.0 | 3.0 | 0.5 | — | | 2.3 | 2170 | 1.8 | 10¹² |
| 20 | 3.0 | 1.0 | 3.0 | 1.0 | — | | 2.4 | 2082 | 1.8 | 10¹² |
| *21 | 3.0 | 1.0 | 3.0 | 1.1 | — | | 2.3 | 1671 | 1.7 | 10¹² |
| 22 | 3.0 | 1.0 | 3.0 | 0.5 | MnO | 0.3 | 2.2 | 2173 | 1.6 | 10¹² |
| *23 | 3.0 | 1.0 | 3.0 | 0.5 | MnO | 0.6 | 2.4 | 2108 | 1.5 | 10¹² |
| 24 | 3.0 | 1.0 | 3.0 | 0.5 | Cr₂O₃ | 0.3 | 2.3 | 2132 | 1.7 | 10¹² |
| *25 | 3.0 | 1.0 | 3.0 | 0.5 | Cr₂O₃ | 0.6 | 2.2 | 2191 | 1.6 | 10¹² |
| 26 | 3.0 | 1.0 | 3.0 | 0.5 | Fe₂O₃ | 0.3 | 2.3 | 2290 | 1.7 | 10¹² |
| *27 | 3.0 | 1.0 | 3.0 | 0.5 | Fe₂O₃ | 0.6 | 2.4 | 2052 | 1.6 | 10¹² |
| 28 | 3.0 | 1.0 | 3.0 | 0.5 | NiO | 0.3 | 2.5 | 2227 | 1.6 | 10¹² |
| *29 | 3.0 | 1.0 | 3.0 | 0.5 | NiO | 0.6 | 2.3 | 2190 | 1.5 | 10¹² |
| 30 | 3.0 | 1.0 | 3.0 | 0.5 | CoO | 0.3 | 2.2 | 2182 | 1.5 | 10¹² |
| *31 | 3.0 | 1.0 | 3.0 | 0.5 | CoO | 0.6 | 2.1 | 2133 | 1.5 | 10¹² |

*Comparison example
Remark: Among the additive composition MnO₂ and the like of "other" shows weight % to the main component.

TABLE 12

| No. | CaTiO₃ | Ta₂O₅ | Pr₆O₁₁ | SiO₂ | Other | Bending strength (Kg) | Capacitance (pF) | tan δ (%) | IR (Ω) |
|---|---|---|---|---|---|---|---|---|---|
| *1 | 0 | 3.0 | 3.0 | 0.5 | — | 2.2 | 2473 | 1.8 | 10¹² |
| 2 | 1.0 | 3.0 | 5.0 | 0.7 | — | 2.3 | 2387 | 1.8 | 10¹² |
| 3 | 3.0 | 5.0 | 3.0 | 1.0 | — | 2.3 | 2295 | 1.7 | 10¹² |
| 4 | 0.0 | 3.0 | 5.0 | 0.5 | — | 2.4 | 2163 | 1.6 | 10¹² |
| *5 | 1.0 | 3.0 | 3.0 | 0.3 | — | 2.4 | 1650 | 1.5 | 10¹² |
| *6 | 3.0 | 0 | 3.0 | 0.5 | — | — | — | — | — |
| 7 | 3.0 | 1.0 | 3.0 | 0.7 | — | 2.3 | 2365 | 1.5 | 10¹² |
| 8 | 3.0 | 3.0 | 1.0 | 1.0 | — | 2.5 | 2490 | 1.7 | 10¹² |

TABLE 12-continued

| No. | Additive composition (weight parts) | | | | | | Bending strength (Kg) | Capacitance (pF) | tan δ (%) | IR (Ω) |
|---|---|---|---|---|---|---|---|---|---|---|
| | CaTiO$_3$ | Ta$_2$O$_5$ | Pr$_6$O$_{11}$ | SiO$_2$ | Other | | | | | |
| 9 | 3.0 | 5.0 | 5.0 | 0.5 | — | | 2.2 | 2669 | 1.9 | 10$^{12}$ |
| *10 | 3.0 | 6.0 | 5.0 | 0.7 | — | | 2.4 | 2757 | 1.8 | 10$^{12}$ |
| *11 | 3.0 | 5.0 | 0 | 0.3 | — | | 2.1 | 1521 | 1.8 | 10$^{12}$ |
| *12 | 3.0 | 2.0 | 1.0 | 0 | — | | 1.7 | 2115 | 1.7 | 10$^{12}$ |
| 13 | 3.0 | 3.0 | 3.0 | 0.3 | — | | 2.2 | 2261 | 1.8 | 10$^{12}$ |
| 14 | 3.0 | 3.0 | 5.0 | 0.5 | — | | 2.4 | 2319 | 1.6 | 10$^{12}$ |
| *15 | 3.0 | 1.0 | 6.0 | 1.0 | — | | 2.5 | 1638 | 1.9 | 10$^{12}$ |
| *16 | 3.0 | 1.0 | 3.0 | 0 | — | | 1.8 | 2126 | 1.8 | 10$^{12}$ |
| 17 | 3.0 | 1.0 | 3.0 | 0.1 | — | | 2.4 | 2280 | 1.7 | 10$^{12}$ |
| 18 | 3.0 | 1.0 | 3.0 | 0.3 | — | | 2.3 | 2236 | 1.7 | 10$^{12}$ |
| 19 | 3.0 | 1.0 | 3.0 | 0.5 | — | | 2.3 | 2219 | 1.6 | 10$^{12}$ |
| 20 | 3.0 | 1.0 | 3.0 | 1.0 | — | | 2.4 | 2034 | 1.7 | 10$^{12}$ |
| *21 | 3.0 | 1.0 | 3.0 | 1.1 | — | | 2.4 | 1570 | 1.7 | 10$^{12}$ |
| 22 | 3.0 | 1.0 | 3.0 | 0.5 | MnO | 0.3 | 2.3 | 2273 | 1.7 | 10$^{12}$ |
| *23 | 3.0 | 1.0 | 3.0 | 0.5 | MnO | 0.6 | 2.2 | 2176 | 1.6 | 10$^{12}$ |
| 24 | 3.0 | 1.0 | 3.0 | 0.5 | Cr$_2$O$_3$ | 0.3 | 2.1 | 2369 | 1.6 | 10$^{12}$ |
| *25 | 3.0 | 1.0 | 3.0 | 0.5 | Cr$_2$O$_3$ | 0.6 | 2.5 | 2306 | 1.6 | 10$^{12}$ |
| 26 | 3.0 | 1.0 | 3.0 | 0.5 | Fe$_2$O$_3$ | 0.3 | 2.4 | 2219 | 1.6 | 10$^{12}$ |
| *27 | 3.0 | 1.0 | 3.0 | 0.5 | Fe$_2$O$_3$ | 0.6 | 2.2 | 2189 | 1.5 | 10$^{12}$ |
| 28 | 3.0 | 1.0 | 3.0 | 0.5 | NiO | 0.3 | 2.3 | 2111 | 1.7 | 10$^{12}$ |
| *29 | 3.0 | 1.0 | 3.0 | 0.5 | NiO | 0.6 | 2.2 | 2245 | 1.5 | 10$^{12}$ |
| 30 | 3.0 | 1.0 | 3.0 | 0.5 | CoO | 0.3 | 2.2 | 2275 | 1.7 | 10$^{12}$ |
| *31 | 3.0 | 1.0 | 3.0 | 0.5 | CoO | 0.6 | 2.4 | 2284 | 1.6 | 10$^{12}$ |

*Comparison example
Remark: Among the additive composition MnO$_2$ and the like of "other" shows weight % to the main component.

In the above-mentioned Table 8 through Table 10, the bending strength are lowered in comparison with the embodiments of Table 2 and Table 7. But, this is caused by narrowing of the span of the measuring jig from 2.5 mm to 2.0 mm; and in substance the bending force was improved, and effect of SiO$_2$ addition is observed. This SiO$_2$ addition does not make the effect of improving the bending strength under 0.1 weight parts, and lowers capacitance for addition exceeding 1.0 weight parts. Furthermore, it was confirmed that temperature characteristics are hardly influenced at the addition of 0.1–1.0 weight percent.

Nextly, laminated ceramic capacitors were trially made by using the ultrafine powder SiO$_2$ obtained by the vapor phase method of the sample 16 of the sixth embodiment. 200 pieces were sampled from each lot, and their bending strength were examined with 2.0 mm span shown in FIG. 8, and mean values of the bending strength and their coefficient of variation are shown in Table 13.

TABLE 13

| SiO$_2$ used | Lot No. | Bending strength x (Kg) | Coefficient of variation σ/x (%) |
|---|---|---|---|
| Vapor phase method Ultra fine powder SiO$_2$ | 1 | 2.7 | 3.8 |
| | 2 | 2.8 | 2.9 |
| | 3 | 2.8 | 4.2 |
| Precipitation method Fine powder SiO$_2$ | 1 | 2.6 | 8.7 |
| | 2 | 2.9 | 10.1 |
| | 3 | 2.4 | 7.9 |
| Conventional example Precipitation method granular SiO$_2$ | 1 | 2.8 | 13.4 |
| | 2 | 2.3 | 16.7 |
| | 3 | 2.5 | 14.3 |

As is obvious from Table 13, the composition of the present invention has a high bending strength when using the ultrafine powder SiO$_2$ made by the vapor phase method, and the variations are decreased.

POSSIBLE UTILIZATION IN INDUSTRY

As has been explained above, according to the ceramic high dielectric composition of this invention, there are good characteristics when used as thin film type dielectric body such as laminated ceramic capacitor. That is, it has a composition to meet recent market needs in having high dielectric constant of 3000 or above, having small voltage-dependency, having strong bending strength and having small equivalent series resistance in high frequency, and has particularly high utility in the region of electronic tuner or the like.

We claim:

1. A ceramic high dielectric composition which consists essentially of, in parts by weight:

1 to 5 parts CaTiO$_3$
   1 to 4 parts of Sb$_2$O$_3$, and
   1 to 5 parts of Nd$_2$O$_3$ per 100 parts of BaTiO$_3$ as the host material, the ceramic composition having a dielectric constant ε25 of at least 3,000 measured at 25° C. with 1 KHz at 1 V(AC), tan δ not more than 2.0% measured at an effective voltage of 50 V/mm and a bending strength of at least 690 kg/cm$^2$.

2. A ceramic high dielectric composition which consists essentially of, in parts by weight:

1 to 5 parts of CaTiO$_3$,
   1 to 4 parts of Sb$_2$O$_3$, and
   1 to 5 parts of La$_2$O$_3$ per 100 parts of BaTiO$_3$ as the host material, the ceramic composition having a dielectric constant ε25 of at least 3,000 measured at 25° C. with 1 KHz at 1 V(AC), tan δ not more than 2.0% measured at an effective voltage of 50 V/mm and a bending strength of at least 690 kg/cm$^2$.

3. A ceramic high dielectric composition which consists essentially of, in parts by weight:

1 to 5 parts of CaTiO$_3$,
   1 to 4 parts of Sb$_2$O$_3$, and
   1 to 5 parts of Sm$_2$O$_3$ per 100 parts of $BaTiO_3$ as the host material, the ceramic composition having an dielectric constant $\epsilon 25$ of at least 3,000 measured at 25° C. with 1 KHz at 1 V(AC), tan δ not more than 2.0% measured at an effective voltage of 50 V/mm and a bending strength of at least 690 kg/cm².

4. A ceramic high dielectric composition which consists essentially of, in parts by weight:
   1 to 5 parts of $CaTiO_3$,
   1 to 4 parts of $Sb_2O_3$,
   1 to 5 parts of $Nd_2O_3$, and
   0.1 to 1 parts of $SiO_2$
per 100 parts of $BaTiO_3$ as the host material, the ceramic composition having a dielectric constant $\epsilon 25$ of at least 3,000 measured at 25° C. with 1 KHz at 1 V(AC), tan δ not more than 2.0% measured at an effective voltage of 50 V/mm and a bending strength of at least 690 kg/cm².

5. A ceramic high dielectric composition which consists essentially of, in parts by weight:
   1 to 5 parts of $CaTiO_3$,
   1 to 4 parts of $Sb_2O_3$,
   1 to 5 parts of $La_2O_3$, and
   0.1 to 1 parts of $SiO_2$
per 100 parts by weight of $BaTiO_3$ as the host material, the ceramic composition having a dielectric constant $\epsilon 25$ of at least 3,000 measured at 25° C. with 1 KHz at 1 V(AC), tan δ not more than 2.0% measured at an effective voltage of 50 V/mm and a bending strength of at least 690 kg/cm².

6. A ceramic high dielectric composition which consists essentially of, in parts by weight:
   1 to 5 parts of $CaTiO_3$,
   1 to 4 parts of $Sb_2O_3$,
   1 to 5 parts of $Sm_2O_3$, and
   0.1 to 1 parts of $SiO_2$
per 100 parts by weight of $BaTiO_3$ as the host material, the ceramic composition having a dielectric constant $\epsilon 25$ of at least 3,000 measured at 25° C. with 1 KHz at 1 V(AC), tan δ not more than 2.5% measured at an effective voltage of 50 V/mm and a bending strength of at least 690 kg/cm².

7. A laminated ceramic capacitor made of the composition of claim 1.

8. A laminated ceramic capacitor made of the composition of claim 2.

9. A laminated ceramic capacitor made of the composition of claim 3.

10. A laminated ceramic capacitor made of the composition of claim 4.

11. A laminated ceramic capacitor made of the composition of claim 5.

12. A laminated ceramic capacitor made of the composition of claim 6.

* * * * *